(12) United States Patent
Chang et al.

(10) Patent No.: US 9,618,780 B2
(45) Date of Patent: Apr. 11, 2017

(54) STEREOSCOPIC DISPLAY DEVICE, LCD PANEL, AND ARRAY SUBSTRATE

(71) Applicant: Shenzhen China Star Optoelectronics Technology Co., Ltd., Shenzhen, Guangdong (CN)

(72) Inventors: Tien-Hao Chang, Guangdong (CN); Hua Zheng, Guangdong (CN); Cheng-hung Chen, Guangdong (CN); Shishuai Huang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 330 days.

(21) Appl. No.: 14/387,243

(22) PCT Filed: Sep. 3, 2014

(86) PCT No.: PCT/CN2014/085849
§ 371 (c)(1),
(2) Date: Sep. 23, 2014

(87) PCT Pub. No.: WO2016/029499
PCT Pub. Date: Mar. 3, 2016

(65) Prior Publication Data
US 2016/0246091 A1    Aug. 25, 2016

(30) Foreign Application Priority Data
Aug. 28, 2014  (CN) .......................... 2014 1 0432612

(51) Int. Cl.
G09G 5/00      (2006.01)
G02F 1/133     (2006.01)
(Continued)

(52) U.S. Cl.
CPC ......... *G02F 1/13306* (2013.01); *G02B 27/22* (2013.01); *G02F 1/1368* (2013.01);
(Continued)

(58) Field of Classification Search
CPC ........................ G02F 1/136286; G02F 1/1368
(Continued)

(56) References Cited

U.S. PATENT DOCUMENTS

2009/0179890 A1* 7/2009 Nishimura ........... G09G 3/3688
                                                    345/214
2012/0188338 A1* 7/2012 Fukuyama ......... H04N 13/0029
                                                    348/43

* cited by examiner

*Primary Examiner* — William Boddie
*Assistant Examiner* — Leonid Shapiro
(74) *Attorney, Agent, or Firm* — Andrew C. Cheng

(57) ABSTRACT

A stereoscopic display device, an LCD panel, and an array substrate are provided. The array substrate includes gate lines, share lines, and a switching circuit including a vertical switching circuit, a first switch, a second switch, and an inverter. The first switch includes a gate, a first terminal, and a second terminal; respectively connected with the vertical switching circuit, the Nth share line, and the (N+X)th gate line. The second switch includes a gate, a first terminal, and a second terminal; respectively connected with the vertical switching circuit, the Nth share line, and a control signal. The inverter disposes between the gate of the first or second switch and the vertical switching circuit. The share lines can be independent controlled and low color shift effect is achieved. No additional IC chips and COFs are required, and solving the image blurs and the brightness difference of the two eyes.

19 Claims, 5 Drawing Sheets

(51) Int. Cl.
  *G02B 27/22*    (2006.01)
  *G02F 1/1368*   (2006.01)
  *G02F 1/1362*   (2006.01)
  *G09G 3/36*     (2006.01)

(52) U.S. Cl.
  CPC .... *G02F 1/13624* (2013.01); *G02F 1/136286* (2013.01); *G09G 3/3659* (2013.01); *G09G 2300/0814* (2013.01); *G09G 2310/0297* (2013.01); *G09G 2320/0242* (2013.01)

(58) Field of Classification Search
  USPC ........................................................ 345/204
  See application file for complete search history.

STEREOSCOPIC DISPLAY DEVICE, LCD PANEL, AND ARRAY SUBSTRATE

BACKGROUND OF THE INVENTION

1. Field of the Invention

The present invention relates to the stereoscopic display technology field, and more particularly relates to an array substrate, a liquid crystal display (LCD) panel utilizing the array substrate, and a stereoscopic display device utilizing the array substrate.

2. Description of Related Art

With reference to FIG. 1 and FIG. 2, FIG. 1 is a part structure of an array substrate in the prior art. FIG. 2 is an equivalent circuit diagram of the array substrate shown in FIG. 2.

In the prior art, to achieve a low color shift effect for a stereoscopic display device, one method is using a charge sharing design for a pixel. The method divides that pixel into two pixel areas of a main pixel and a sub pixel. As shown in FIG. 2, when a gate line (charge line) is turned on, the main pixel and the sub pixel are respectively charged through a main TFT Tmain and a sub TFT Tsub. Then, the gate line (charge line) is turned off. After the gate line (charge line) is turned off, a share line is turned on, a TFT Tcs is turned on such that charges of capacitors Cst sub and Clc sub in the sub pixel are redistributed. Finally, the voltage levels of the main pixel and the sub pixel are different to achieve the low color shift effect.

In a three-dimension (3D) display mode, a display method which two fames are inverted is usually used. However, in that method, when the share line is turned on to actuate a charge sharing function, because a capacitor Cb is existed, the low color shift function is abnormal such that the brightness of a sub pixel of a left-eye frame or the brightness of a sub pixel of a right-eye frame is brighter. As a result, the brightness of a left-eye frame and the brightness of a right-eye frame are not identical. Therefore, when displaying a 3D picture, a share TFT (Field Effect Transistor of the share line, that is, the Tcs in FIG. 2) is set to be turned off or be disabled.

In order to set the share TFT to be turned off or be disable, in the prior art, the charge line and the share line are designed to be controlled independently. If the charge sharing function is required to be turned off, the share TFT is turned off to turn off the share line. However, the above method will double the usage of gate IC chip and chip on film (COF).

In another design, in order to reduce the usage of gate IC chip and chip on film (COF), the charge line and the share line are designed to be connected. For example, three charge lines and one share line are connected, called a N+2 charge sharing design. In the above design, when the Nth charge line is turned on, a Nth pixel is charged. Then, when the (N+2)th charge line is turned on, because the (N+2)th charge line and the Nth share line are connected, a sub pixel of the Nth pixel generates the charge sharing function so as to achieve the low color shift effect. However, the share line of that design cannot be independently controlled such that the low color shift cannot be turned off through turning off the share line. As a result, in the 3D display mode, an image blur in sight and a brightness difference of the left eye and the right eye will occur.

SUMMARY OF THE INVENTION

Accordingly, the present invention provides a stereoscopic display device, a liquid crystal display (LCD) panel, and an array substrate. The present invention can achieve the low color shift effect and the independent control of the share line. Besides, the embodiment of the present invention does not require additional IC chips and COFs and can solve the problems of the image blur in sight and the brightness difference of the left eye and the right eye in the 3D display mode.

In order to solve the above problems, a technique solution used in the present invention is: an array substrate of a liquid crystal display (LCD) panel, comprising: multiple gate lines; multiple share lines, wherein, the multiple gate lines and the multiple share lines are disposed alternately and are parallel with each other; and a switching circuit including a vertical switching circuit, a first switch, a second switch, and an inverter; wherein, a gate of the first switch is electrically connected with the vertical switching circuit; a first terminal of the first switch is electrically connected with the Nth share line; a second terminal of the first switch is electrically connected with the (N+X)th gate line; wherein, a gate of the second switch is electrically connected with the vertical switching circuit; a first terminal of the second switch is electrically connected with the Nth share line; a second terminal of the second switch is for obtaining a control signal; wherein, the inverter is disposed between the gate of the first switch and the vertical switching circuit, or disposed between the gate of the second switch and the vertical switching circuit; when performing a three-dimension (3D) display, the vertical switching circuit and the control signal cooperate to control the first switch and the second switch so as to turn off the Nth share line; and wherein, the N and X are natural numbers; the Nth gate line and the Nth share line are disposed with an interval and are adjacent.

Wherein, the second terminal of the second switch is electrically connected with a negative power input line for obtaining the control signal.

Wherein, the second terminal of the second switch is electrically connected with the Nth gate line for obtaining the control signal.

Wherein, an input terminal of the inverter is electrically connected with the vertical switching circuit and an output terminal of the inverter is electrically connected with the gate of the first switch.

Wherein, an input terminal of the inverter is electrically connected with the vertical switching circuit and an output terminal of the inverter is electrically connected with the gate of the first switch.

Wherein, an input terminal of the inverter is electrically connected with the vertical switching circuit and an output terminal of the inverter is electrically connected with the gate of the second switch.

Wherein, an input terminal of the inverter is electrically connected with the vertical switching circuit and an output terminal of the inverter is electrically connected with the gate of the second switch.

In order to solve the above problems, a technique solution used in the present invention is: an LCD panel, wherein, the LCD panel disposed with anyone of the array substrates described foregoing.

Wherein, the X equals to 1.

In order to solve the above problems, a technique solution used in the present invention is: a stereoscopic display device, wherein, the stereoscopic display device includes an LCD panel, and the LCD panel disposed with anyone of the array substrates described foregoing.

Wherein, the X equals to 1.

The beneficial effects of the present invention are: through utilizing the vertical switching circuit Vsw, the first switch T1, and the second terminal of the second switch T2 for obtaining the control signal in order to achieve the independent control of the share line such that low color shift effect is effectively achieved. Besides, the embodiment of the present invention does not require additional IC chips and COFs and can solve the problems of the image blur in sight and the brightness difference of the left eye and the right eye in the 3D display mode.

DETAILED DESCRIPTION OF THE PREFERRED EMBODIMENT

The following content combines with the drawings and the embodiment for describing the present invention in detail. It is obvious that the following embodiments are only some embodiments of the present invention. For the skilled persons of ordinary skill in the art without creative effort, the other embodiments obtained thereby are still covered by the present invention.

Figure 1:
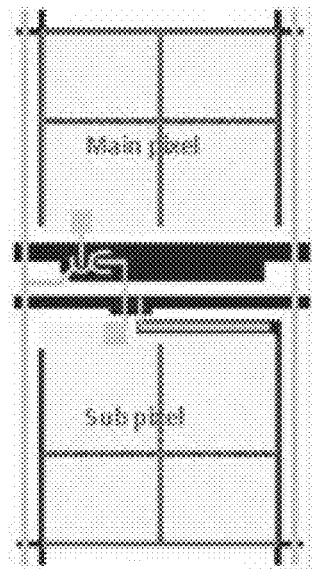
FIG. 1 is a schematic diagram of a part structure of an array substrate in the prior art.
Figure 2:
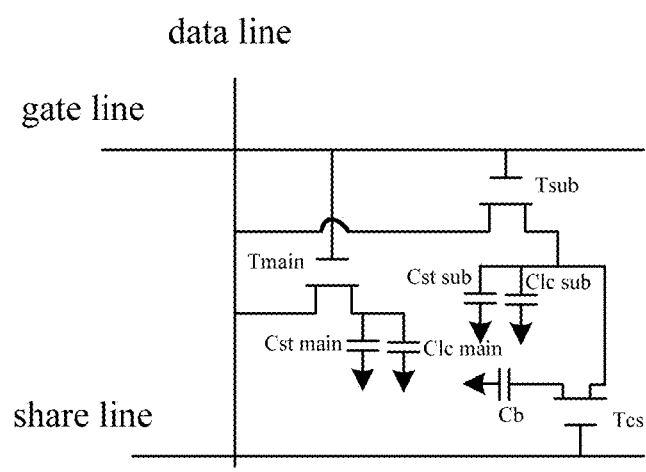
FIG. 2 is an equivalent circuit diagram of the array substrate shown in FIG.
Figure 3:
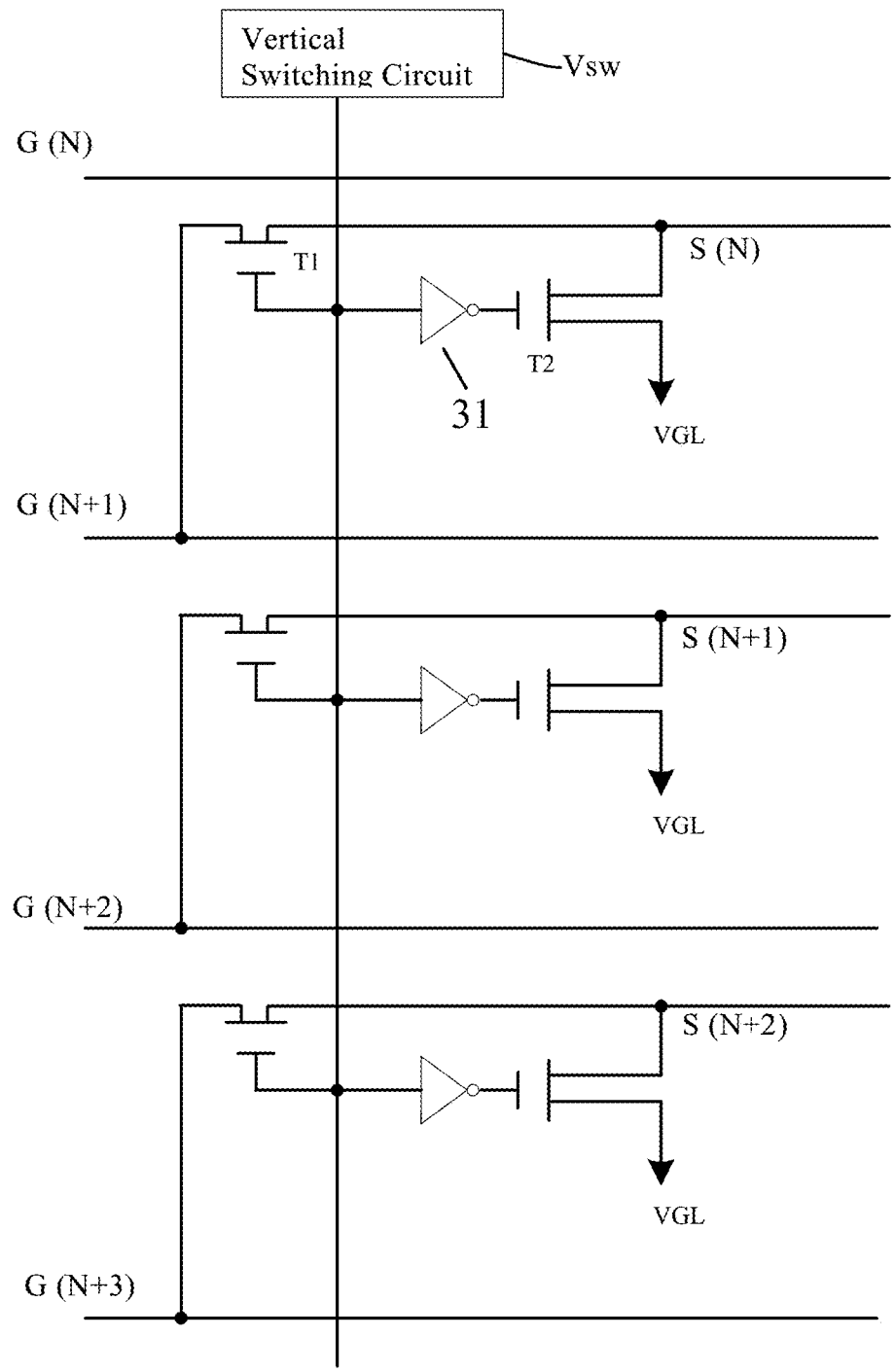
FIG. 3 is an equivalent circuit diagram of an array substrate according to a first embodiment of the present invention.

With reference to FIG. 3, FIG. 3 is an equivalent circuit diagram of an array substrate according to a first embodiment of the present invention. The array substrate of the present embodiment includes multiple gate lines G(N), G(N+1) . . . ; multiple share lines S(N), S(N+1) . . . ; and a switching circuit. However, the array substrate of the present embodiment may not be limited to the above elements.

In the present embodiment, the multiple gate lines and the multiple share lines are disposed alternately and are parallel with each other. That is, each gate line and each share line are disposed alternately and disposed line by line.

The switching circuit of the present embodiment includes a vertical switching circuit Vsw, a first switch T1, a second switch T2, and an inverter 31.

Specifically, as shown in FIG. 3, a gate of the first switch T1 is electrically connected with the vertical switching circuit Vsw. A first terminal of the first switch T1 is electrically connected with the Nth share line S(N). A second terminal of the first switch T1 is electrically connected with the (N+X)th gate line G(N+X). A first terminal of the second switch T2 is electrically connected with the Nth share line S(N). A gate of the second switch T2 is electrically connected with the vertical switching circuit Vsw. A second terminal of the second switch T2 is electrically connected with a negative power input line VGL for obtaining a control signal.

The inverter 31 of the present embodiment is disposed between the gate of the second switch T2 and the vertical switching circuit Vsw such that when performing a 3D display, the vertical switching circuit Vsw and the control signal cooperate to control the first switch T1 and the second switch T2 so as to turn off the Nth share line. Wherein, the N and X are natural numbers. The Nth gate line and the Nth share line are disposed with an interval and are adjacent.

Specifically, the present embodiment uses the X equaling to 1 as an example but the X may be 2, 3, or 4 etc. Besides, the person skilled in the art can understand that an input terminal of the inverter 31 is electrically connected with the vertical switching circuit Vsw and an output terminal of the inverter 31 is electrically connected with the gate of the second switch T2 so as to apply the phase inversion function to the vertical switching circuit Vsw.

In an operation process, in a two-dimension (2D) mode, the vertical switching circuit Vsw is operated at a high voltage level. At this time, the first switch T1 is turned on such that the (N+1)th gate line is electrically connected with the Nth share line, and the gate of the second switch T2 is maintained at a low voltage level through the function of the inverter 31 such that the second switch T2 is turned off. At this time, the second switch T2 is turned off such that the Nth share line and the negative power input line VGL are disconnected. Therefore, a normal charge sharing function is maintained. Then, in a three-dimension (3D) mode, the vertical switching circuit Vsw is operated at a low voltage level. At this time, the first switch T1 is turned off such that the (N+1)th gate line and the Nth share line are disconnected, and the gate of the second switch T2 is maintained at a high voltage level through the function of the inverter 31 such that the second switch T2 is turned on. At this time, the second switch T2 is turned on such that the Nth share line is connected with the negative power input line VGL. As a result, a signal of the Nth share line is maintained at the voltage level of the negative power input line VGL such that a share TFT in a pixel area can be turned off so as to turn off the charge sharing function.

The present embodiment utilizes the vertical switching circuit Vsw, the first switch T1, and the second terminal of the second switch T2 for obtaining the control signal in order to achieve the independent control of the share line such that low color shift effect is effectively achieved. Besides, the embodiment of the present invention does not require additional IC chips and COFs and can solve the problems of the image blur in sight and the brightness difference of the left eye and the right eye in the 3D display mode.

Figure 4:
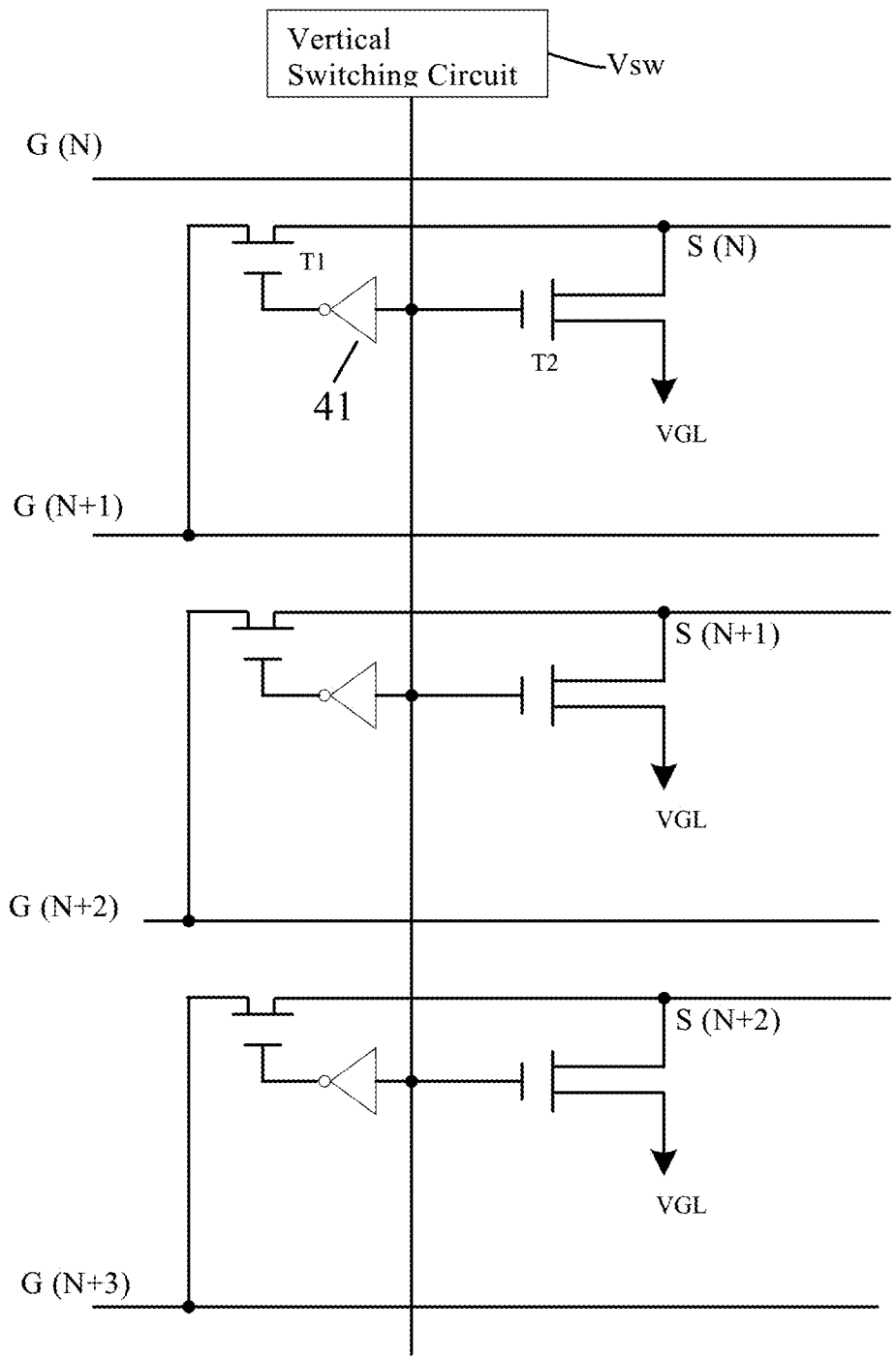
FIG. 4 is an equivalent circuit diagram of an array substrate according to a second embodiment of the present invention.

Next, with reference to FIG. 4, FIG. 4 is an equivalent circuit diagram of an array substrate according to a second embodiment of the present invention. The array substrate of the present embodiment includes multiple gate lines G(N), G(N+1) . . . ; multiple share lines S(N), S(N+1) . . . ; and a switching circuit. However, the array substrate of the present embodiment may not be limited to the above elements.

In the present embodiment, the multiple gate lines and the multiple share lines are disposed alternately and parallel with each other. That is, each gate line and each share line are disposed alternately and disposed line by line.

The switching circuit of the present embodiment includes a vertical switching circuit Vsw, a first switch T1, a second switch T2, and an inverter 41.

Specifically, as shown in FIG. 4, a gate of the first switch T1 is electrically connected with the vertical switching circuit Vsw. A first terminal of the first switch T1 is electrically connected with the Nth share line S(N). A second terminal of the first switch T1 is electrically connected with the (N+X)th gate line G(N+X). A first terminal of the second switch T2 is electrically connected with the Nth share line S(N). A gate of the second switch T2 is electrically connected with the vertical switching circuit Vsw. A second terminal of the second switch T2 is electrically connected with a negative power input line VGL for obtaining a control signal.

The difference between this embodiment and the first embodiment is that the inverter 41 of the present embodiment is disposed between the gate of the first switch and the vertical switching circuit Vsw such that when performing a 3D display, the vertical switching circuit Vsw and the control signal cooperate to control the first switch T1 and the second switch T2 so as to turn off the Nth share line. Wherein, the N and X are natural numbers. The Nth gate line and the Nth share line are disposed with an interval and are adjacent.

Specifically, the present embodiment uses the X equaling to 1 as an example but the X may be 2, 3, or 4 etc. Besides, the person skilled in the art can understand that an input terminal of the inverter 41 is electrically connected with the vertical switching circuit Vsw and an output terminal of the inverter 41 is electrically connected with the gate of the second switch T1 so as to apply the phase inversion function to the vertical switching circuit Vsw.

In an operation process, in a two-dimension (2D) mode, the vertical switching circuit Vsw is operated at a low voltage level. At this time, the second switch T2 is turned off such that the Nth share line and the negative power input line VGL are disconnected, and the gate of the first switch T1 is maintained at a high voltage level through the function of the inverter 41 such that the first switch T1 is turned on. At this time, the first switch T1 is turned on such that the (N+1)th gate line is electrically connected with the Nth share line. Therefore, a normal charge sharing function is maintained. Then, in a three-dimension (3D) mode, the vertical switching circuit Vsw is operated at a high voltage level. At this time, the second switch T2 is turned on such that the Nth share line is connected with the negative power input line VGL. As a result, a signal of the Nth share line is maintained at the voltage level of the negative power input line VGL. The gate of the first switch T1 is maintained at a low voltage level through the function of the inverter 41 such that the first switch T1 is turned off. The first switch T1 is turned off such that the (N+1)th gate line and the Nth share line are disconnected. A share TFT in a pixel area can be turned off so as to turn off the charge sharing function. That is, through turning off the share TFT in a pixel area in order to turn off the charge sharing function.

The present embodiment utilizes the vertical switching circuit Vsw, the first switch T1, and the second terminal of the second switch T2 for obtaining the control signal in order to achieve the independent control of the share line such that low color shift effect is effectively achieved. Besides, the embodiment of the present invention does not require additional IC chips and COFs and can solve the problems of the image blur in sight and the brightness difference of the left eye and the right eye in the 3D display mode.

Figure 5:
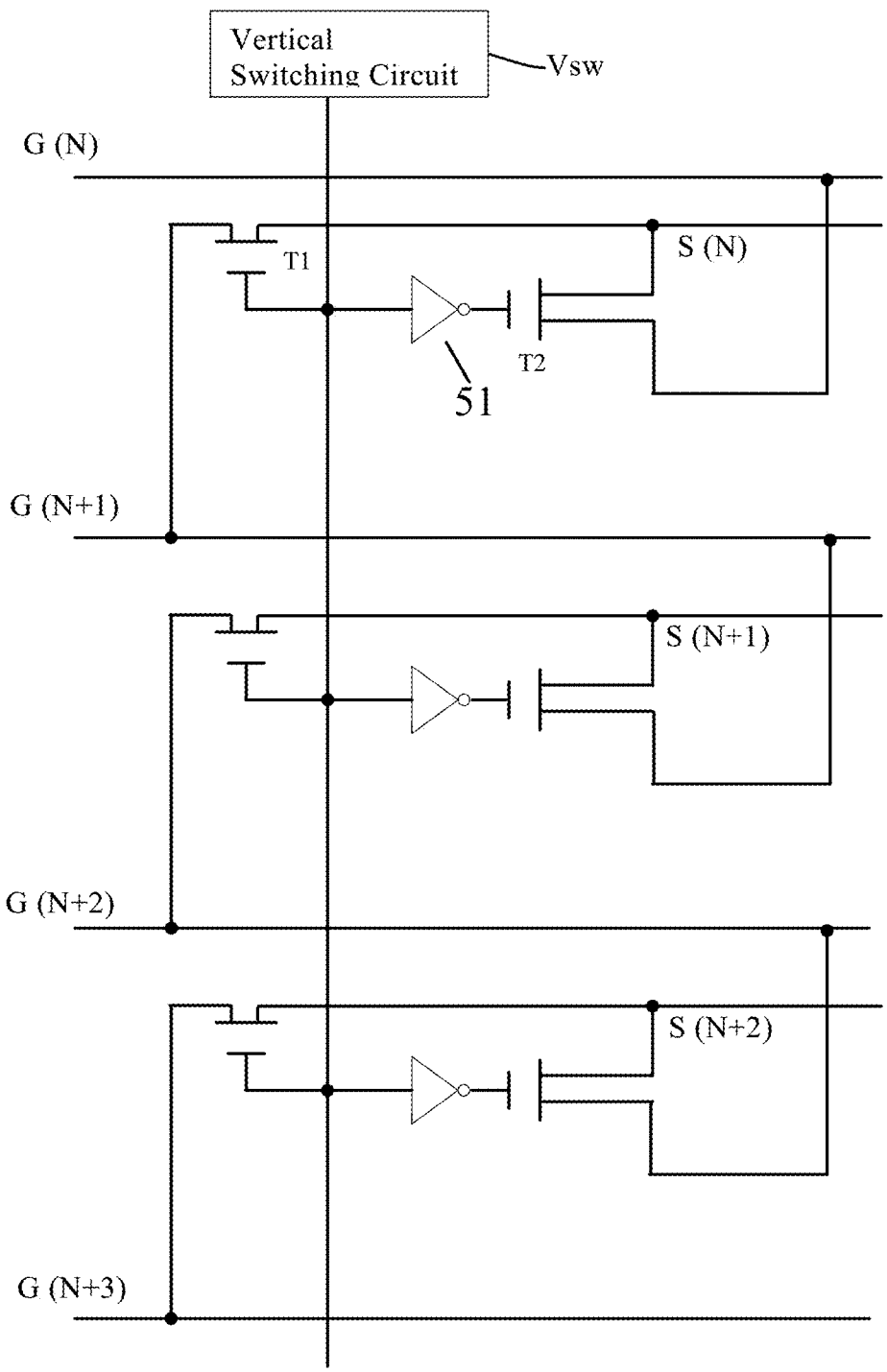
FIG. 5 is an equivalent circuit diagram of an array substrate according to a third embodiment of the present invention.

Next, with reference to FIG. 3 and FIG. 5, FIG. 5 is an equivalent circuit diagram of an array substrate according to a third embodiment of the present invention. The array substrate of the present embodiment includes multiple gate lines G(N), G(N+1) . . . ; multiple share lines S(N), S(N+1) . . . ; and a switching circuit. However, the array substrate of the present embodiment may not be limited to the above elements.

In the present embodiment, the multiple gate lines and the multiple share lines are disposed alternately and parallel with each other. That is, each gate line and each share line are disposed alternately and disposed line by line.

The switching circuit of the present embodiment includes a vertical switching circuit Vsw, a first switch T1, a second switch T2, and an inverter 51.

Specifically, as shown in FIG. 5, a gate of the first switch T1 is electrically connected with the vertical switching circuit Vsw. A first terminal of the first switch T1 is electrically connected with the Nth share line S(N). A second terminal of the first switch T1 is electrically connected with the (N+X)th gate line G(N+X). A first terminal of the second switch T2 is electrically connected with the Nth share line S(N). A gate of the second switch T2 is electrically connected with the vertical switching circuit Vsw. The difference between this embodiment and the first embodiment is that a second terminal of the second switch T2 is electrically connected with the Nth gate line to obtain a control signal.

The inverter 51 of the present embodiment is disposed between the gate of the second switch T2 and the vertical switching circuit Vsw such that when performing a 3D display, the vertical switching circuit Vsw and the control signal cooperate to control the first switch T1 and the second switch T2 so as to turn off the Nth share line. Wherein, the N and X are natural numbers. The Nth gate line and the Nth share line are disposed with an interval and are adjacent.

Specifically, the present embodiment uses the X equaling to 1 as an example but the X may be 2, 3, or 4 etc. Besides, the person skilled in the art can understand that an input terminal of the inverter 51 is electrically connected with the vertical switching circuit Vsw and an output terminal of the inverter 51 is electrically connected with the gate of the second switch T2 so as to apply the phase inversion function to the vertical switching circuit Vsw.

In an operation process, in a two-dimension (2D) mode, the vertical switching circuit Vsw is operated at a high voltage level. At this time, the first switch T1 is turned on such that the (N+1)th gate line is electrically connected with the Nth share line, and the gate of the second switch T2 is maintained at a low voltage level through the function of the inverter 51 such that the second switch T2 is turned off. At this time, the second switch T2 is turned off such that the Nth share line and the Nth gate line are disconnected. Therefore, a normal charge sharing function is maintained. Then, in a three-dimension (3D) mode, the vertical switching circuit Vsw is operated at a low voltage level. At this time, the first switch T1 is turned off such that the (N+1)th gate line and the Nth share line are disconnected, and the gate of the second switch T2 is maintained at a high voltage level through the function of the inverter 51 such that the second switch T2 is turned on. At this time, the second switch T2 is turned on such that the Nth share line is electrically connected with the Nth gate line. As a result, the voltage level of the Nth share line and the voltage level of the Nth gate line are the same such that the charge sharing function can be turned off and be disabled.

The present embodiment utilizes the vertical switching circuit Vsw, the first switch T1, and the second terminal of the second switch T2 for obtaining the control signal in order to achieve the independent control of the share line such that low color shift effect is effectively achieved. Besides, the embodiment of the present invention does not require additional IC chips and COFs and can solve the problems of the image blur in sight and the brightness difference of the left eye and the right eye in the 3D display mode.

Figure 6:
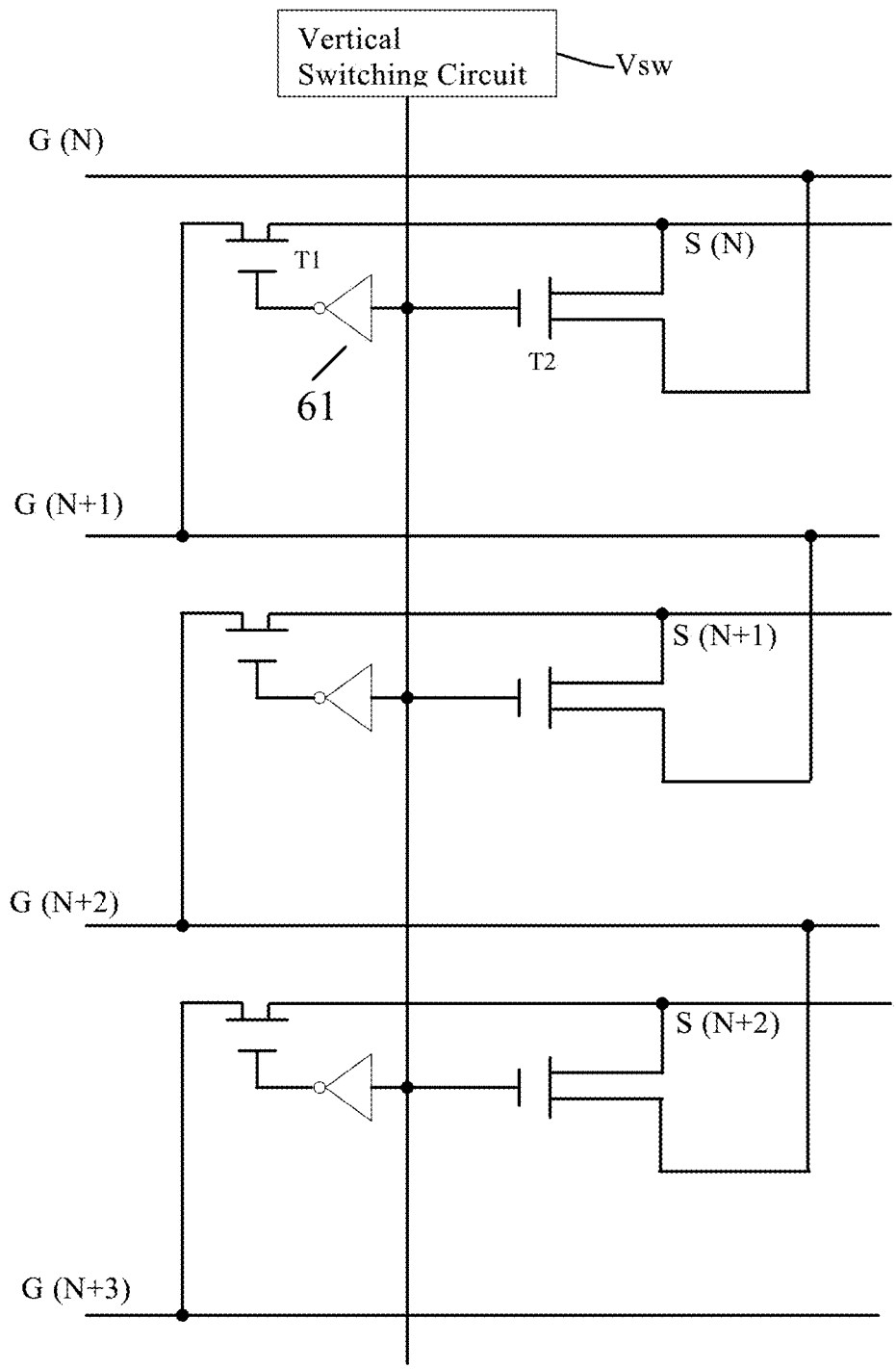
FIG. 6 is an equivalent circuit diagram of an array substrate according to a fourth embodiment of the present invention.

Next, with reference to FIG. 4 and FIG. 6, FIG. 6 is an equivalent circuit diagram of an array substrate according to a fourth embodiment of the present invention. The array substrate of the present embodiment includes multiple gate lines G(N), G(N+1) . . . ; multiple share lines S(N), S(N+

1) . . . ; and a switching circuit. However, the array substrate of the present embodiment may not be limited to the above elements.

In the present embodiment, the multiple gate lines and the multiple share lines are disposed alternately and parallel with each other. That is, each gate line and each share line are disposed alternately and disposed line by line.

The switching circuit of the present embodiment includes a vertical switching circuit Vsw, a first switch T1, a second switch T2, and an inverter 61.

Specifically, as shown in FIG. 6, a gate of the first switch T1 is electrically connected with the vertical switching circuit Vsw. A first terminal of the first switch T1 is electrically connected with the Nth share line S(N). A second terminal of the first switch T1 is electrically connected with the (N+X)th gate line G(N+X). A first terminal of the second switch T2 is electrically connected with the Nth share line S(N). A gate of the second switch T2 is electrically connected with the vertical switching circuit Vsw. The difference between the present embodiment and the second embodiment is that a second terminal of the second switch T2 is electrically connected with the Nth gate line to obtain a control signal.

The difference between this embodiment and the third embodiment is that the inverter 61 of the present embodiment is disposed between the gate of the first switch and the vertical switching circuit Vsw such that when performing a 3D display, the vertical switching circuit Vsw and the control signal cooperate to control the first switch T1 and the second switch T2 so as to turn off the Nth share line. Wherein, the N and X are natural numbers. The Nth gate line and the Nth share line are disposed with an interval and are adjacent.

Specifically, the present embodiment uses the X equaling to 1 as an example but the X may be 2, 3, or 4 etc. Besides, the person skilled in the art can understand that an input terminal of the inverter 61 is electrically connected with the vertical switching circuit Vsw and an output terminal of the inverter 61 is electrically connected with the gate of the second switch T1 so as to apply the phase inversion function to the vertical switching circuit Vsw.

In an operation process, in a two-dimension (2D) mode, the vertical switching circuit Vsw is operated at a low voltage level. At this time, the second switch T2 is turned off such that the Nth share line and the Nth gate line are disconnected, and the gate of the first switch T1 is maintained at a high voltage level through the function of the inverter 61 such that the first switch T1 is turned on. At this time, the first switch T1 is turned on such that the (N+1)th gate line is electrically connected with the Nth share line. Therefore, a normal charge sharing function is maintained. Then, in a three-dimension (3D) mode, the vertical switching circuit Vsw is operated at a high voltage level. At this time, the second switch T2 is turned on such that the Nth share line is electrically connected with the Nth gate line. As a result, the voltage level of the Nth share line and the voltage level of the Nth gate line are the same. The gate of the first switch T1 is maintained at a low voltage level through the function of the inverter 61 such that the first switch T1 is turned off. The first switch T1 is turned off such that the (N+1)th gate line and the Nth share line are disconnected. Finally, the charge sharing function is turned off.

The present embodiment utilizes the vertical switching circuit Vsw, the first switch T1, and the second terminal of the second switch T2 for obtaining the control signal in order to achieve the independent control of the share line such that low color shift effect is effectively achieved. Besides, the embodiment of the present invention does not require additional IC chips and COFs and can solve the problems of the image blur in sight and the brightness difference of the left eye and the right eye in the 3D display mode.

The present invention also provides a liquid crystal display (LCD) panel. The LCD panel provides with anyone of the array substrates described foregoing. Preferably, the X equals to 1 in order to save the cost.

The present invention also provides a stereoscopic display device. The stereoscopic display device includes a liquid crystal display (LCD) panel. The LCD panel is disposed with anyone of the array substrates described foregoing. Preferably, the X equals to 1 in order to save the cost.

The array substrate, the LCD panel utilizing the array substrate, and the stereoscopic display device utilizing the array substrate use the vertical switching circuit Vsw, the first switch T1, and the second terminal of the second switch T2 for obtaining the control signal in order to achieve the independent control of the share line such that low color shift effect is effectively achieved. Besides, the embodiment of the present invention does not require additional IC chips and COFs and can solve the problems of the image blur in sight and the brightness difference of the left eye and the right eye in the 3D display mode.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. An array substrate of a liquid crystal display (LCD) panel, comprising:
   multiple gate lines;
   multiple share lines, and each share line is connected to a share switch in a pixel area, wherein, the multiple gate lines and the multiple share lines are disposed alternately and are parallel with each other; and
   a switching unit configured to turn on or turn off the share switch, and including a vertical switching circuit, a first switch, a second switch, and an inverter;
   wherein, a gate of the first switch is electrically connected with the vertical switching circuit; a first terminal of the first switch is electrically connected with the Nth share line; a second terminal of the first switch is electrically connected with the (N+X)th gate line;
   wherein, a gate of the second switch is electrically connected with the vertical switching circuit; a first terminal of the second switch is electrically connected with the Nth share line; a second terminal of the second switch is for obtaining a control signal capable of controlling the share switch in the pixel area through the share line;
   wherein, the inverter is disposed between the gate of the first switch and the vertical switching circuit, or disposed between the gate of the second switch and the vertical switching circuit; when performing a three-dimension (3D) display, the vertical switching circuit and the control signal cooperate to control the first switch and the second switch so as to turn off the share switch through the Nth share line; and
   wherein, the N and X are natural numbers; the Nth gate line and the Nth share line are disposed with an interval and are adjacent.

2. The array substrate according to claim 1, wherein, the share switch is used for redistributing charges of capacitors in the pixel area, and the second terminal of the second switch is electrically connected with a negative power input line for obtaining the control signal.

3. The array substrate according to claim 1, wherein, the share switch is used for redistributing charges of capacitors in the pixel area, and the second terminal of the second switch is electrically connected with the Nth gate line for obtaining the control signal.

4. The array substrate according to claim 2, wherein, an input terminal of the inverter is electrically connected with the vertical switching circuit and an output terminal of the inverter is electrically connected with the gate of the first switch.

5. The array substrate according to claim 3, wherein, an input terminal of the inverter is electrically connected with the vertical switching circuit and an output terminal of the inverter is electrically connected with the gate of the first switch.

6. The array substrate according to claim 2, wherein, an input terminal of the inverter is electrically connected with the vertical switching circuit and an output terminal of the inverter is electrically connected with the gate of the second switch.

7. The array substrate according to claim 3, wherein, an input terminal of the inverter is electrically connected with the vertical switching circuit and an output terminal of the inverter is electrically connected with the gate of the second switch.

8. A liquid crystal display (LCD) panel provided with an array substrate, wherein, the array substrate comprises:
   multiple gate lines;
   multiple share lines, and each share line is connected to a share switch in a pixel area, wherein, the multiple gate lines and the multiple share lines are disposed alternately and are parallel with each other; and
   a switching unit configured to turn on or turn off the share switch, and including a vertical switching circuit, a first switch, a second switch, and an inverter;
      wherein, a gate of the first switch is electrically connected with the vertical switching circuit; a first terminal of the first switch is electrically connected with the Nth share line; a second terminal of the first switch is electrically connected with the (N+X)th gate line;
      wherein, a gate of the second switch is electrically connected with the vertical switching circuit; a first terminal of the second switch is electrically connected with the Nth share line; a second terminal of the second switch is for obtaining a control signal capable of controlling the share switch in the pixel area through the share line;
      wherein, the inverter is disposed between the gate of the first switch and the vertical switching circuit, or disposed between the gate of the second switch and the vertical switching circuit; when performing a three-dimension (3D) display, the vertical switching circuit and the control signal cooperate to control the first switch and the second switch so as to turn off the share switch through the Nth share line; and
      wherein, the N and X are natural numbers; the Nth gate line and the Nth share line are disposed with an interval and are adjacent.

9. The LCD panel according to claim 8, wherein, the share switch is used for redistributing charges of capacitors in the pixel area, and the second terminal of the second switch is electrically connected with a negative power input line for obtaining the control signal.

10. The LCD panel according to claim 8, wherein, the share switch is used for redistributing charges of capacitors in the pixel area, and the second terminal of the second switch is electrically connected with the Nth gate line for obtaining the control signal.

11. The LCD panel according to claim 9, wherein, an input terminal of the inverter is electrically connected with the vertical switching circuit and an output terminal of the inverter is electrically connected with the gate of the first switch.

12. The LCD panel according to claim 10, wherein, an input terminal of the inverter is electrically connected with the vertical switching circuit and an output terminal of the inverter is electrically connected with the gate of the first switch.

13. The LCD panel according to claim 9, wherein, an input terminal of the inverter is electrically connected with the vertical switching circuit and an output terminal of the inverter is electrically connected with the gate of the second switch.

14. The LCD panel according to claim 10, wherein, an input terminal of the inverter is electrically connected with the vertical switching circuit and an output terminal of the inverter is electrically connected with the gate of the second switch.

15. The LCD panel according to claim 8, wherein, the X equals to 1.

16. A stereoscopic display device including a liquid crystal display (LCD) panel, and the LCD panel provides with an array substrate, wherein, the array substrate comprises:
   multiple gate lines;
   multiple share lines, and each share line is connected to a share switch in a pixel area, wherein, the multiple gate lines and the multiple share lines are disposed alternately and are parallel with each other; and
   a switching unit configured to turn on or turn off the share switch, and including a vertical switching circuit, a first switch, a second switch, and an inverter;
      wherein, a gate of the first switch is electrically connected with the vertical switching circuit; a first terminal of the first switch is electrically connected with the Nth share line; a second terminal of the first switch is electrically connected with the (N+X)th gate line;
      wherein, a gate of the second switch is electrically connected with the vertical switching circuit; a first terminal of the second switch is electrically connected with the Nth share line; a second terminal of the second switch is for obtaining a control signal capable of controlling the share switch in the pixel area through the share line;
      wherein, the inverter is disposed between the gate of the first switch and the vertical switching circuit, or disposed between the gate of the second switch and the vertical switching circuit; when performing a three-dimension (3D) display, the vertical switching circuit and the control signal cooperate to control the first switch and the second switch so as to turn off the share switch through the Nth share line; and
      wherein, the N and X are natural numbers; the Nth gate line and the Nth share line are disposed with an interval and are adjacent.

17. The stereoscopic display device according to claim 16, wherein, the share switch is used for redistributing charges of capacitors in the pixel area, and the second terminal of the second switch is electrically connected with a negative power input line for obtaining the control signal.

18. The stereoscopic display device according to claim 17, wherein, the share switch is used for redistributing charges of capacitors in the pixel area, and an input terminal of the inverter is electrically connected with the vertical switching circuit and an output terminal of the inverter is electrically connected with the gate of the first switch.

19. The stereoscopic display device according to claim 18, wherein, the X equals to 1.

* * * * *